US005100468A

United States Patent [19]

Yuasa et al.

[11] Patent Number: 5,100,468

[45] Date of Patent: Mar. 31, 1992

[54] IMAGE RECORDING INK

[75] Inventors: Toshiya Yuasa, Mitaka; Hiroshi Fukumoto; Kohzoh Arahara, both of Kawasaki; Toshikazu Ohnishi, Atsugi, all of Japan; Fumitaka Kan, deceased, late of Tokyo, Japan, by Akiko Kan, legal successor

[73] Assignee: Canon Kabushiki Kaisha, Tokyo, Japan

[21] Appl. No.: 241,211

[22] Filed: Sep. 7, 1988

[30] Foreign Application Priority Data

Sep. 9, 1987 [JP] Japan ............ 62-224145
Jan. 25, 1988 [JP] Japan ............ 63-015243

[51] Int. Cl.$^5$ ............ C09D 11/02

[52] U.S. Cl. ............ 106/20; 106/22; 106/24; 106/26

[58] Field of Search ............ 106/20, 22, 24, 26

[56] References Cited

U.S. PATENT DOCUMENTS 4,183,765 1/1980 Podlas ............ 106/187
4,352,691 10/1982 Owatari et al. ............ 106/22
4,548,734 10/1985 Chaux et al. ............ 252/312
4,549,907 10/1985 Kohn ............ 106/208
4,838,940 6/1989 Kan et al. ............ 106/22
4,881,084 11/1989 Kan et al. ............ 106/25
4,920,361 4/1990 Arahara et al. ............ 106/20

FOREIGN PATENT DOCUMENTS 0280214 8/1988 European Pat. Off. .
0292938 11/1988 European Pat. Off. .
2601900 1/1988 France .

*Primary Examiner*—William R. Dixon, Jr.
*Assistant Examiner*—Helene Klemanski
*Attorney, Agent, or Firm*—Fitzpatrick, Cella, Harper & Scinto

[57] ABSTRACT

An ink which can cause a change in its adhesiveness by an electrochemical reaction is obtained by impregnating a crosslinked substance such as polyvinyl alcohol with a liquid dispersion medium comprising an organic solvent having a relative dielectric constant of 15 or larger at 25° C. such as ethylene glycol. The ink shows little characteristic change due to drying, etc., and suitably retains its fluidity when left standing in the air for a long period. The ink is supplied with a pattern of energy to be provided with an adhesive pattern, which is then transferred to a recording medium such as plain paper, directly or by the medium of an intermediate transfer medium to form an ink pattern corresponding to the energy pattern applied.

4 Claims, 6 Drawing Sheets

IMAGE RECORDING INK

FIELD OF THE INVENTION AND RELATED ART

The present invention relates to an ink adapted to an image recording method which retains various advantages of the conventional recording systems and yet realizes a low recording cost.

In recent years, along with the rapid progress of information industries, various data processing systems have been developed, and accordingly various recording methods and recording apparatus have been developed and adopted for the respective data processing systems. Among these, representative recording systems capable of recording on plain paper include electrophotography and laser beam printing system developed therefrom, ink jetting, thermal transfer, and impact printing system using a wire dot printer or daisy-wheel printer.

The impact printing system produces annoying noise and the application thereof to full- or multi-color recording is difficult. The electrophotography and the laser beam printing produce images at a high resolution, but the apparatus therefor are complicated and large in size thus requiring a large apparatus cost. The ink jet printing system requires only a small expendable cost but involves a process defect in that, because a thin nozzle is used for jetting a low-viscosity liquid ink therefrom, the nozzle is liable to be clogged with the ink solidified during a period of non-use. Further, as the ink for the ink jet system is low-viscosity ink, the ink is liable to spread after it is deposited on paper, thus resulting in blurring of images.

Further, according to the thermal transfer method, a heat pattern was supplied to a solid ink layer formed on a sheet form support to form a fused ink pattern, which is then transferred to plain paper, etc., to form an image thereon. The thermal transfer method has advantages in that a relatively small apparatus is used and therefore only a small apparatus cost is required. However, an ink ribbon used in the thermal transfer method is composed by forming a solid ink layer on an expensive support and the ink ribbon is disposed of after use, so that the thermal transfer method involves a disadvantage in that it requires a high expendable cost.

In order to remove the above disadvantage of the thermal transfer method, Japanese Patent Publication (JP-B) 59-40627 has proposed a thermal transfer system which does not necessitate the use of an ink ribbon used in the conventional thermal transfer method by coating a roller with a heat-fusible ink. More specifically, JP-B 59-40627 discloses a recording system wherein a roller is coated with a heat-fusible ink showing a plasticity and containing electroconductive powder. Heat generated by current-conduction from a recording electrode is supplied to the ink and the resultant fused ink is transferred to paper. However, the ink used in JP-B 59-40627 is plastic, so that an image formed by conduction-heating in the ink on the roller is liable to be deformed and disturbed. Further, the conductivity is provided by inclusion of a necessarily large amount of conductive powder, so that the color of the ink is constrained by the conductive powder generally colored in black. As a result, it is difficult to constitute and use an ink of a color other than black.

U.S. Pat. No. 4,462,035 discloses an apparatus similar to that of the above JP-B 59-40627. In this apparatus, however, since a roller is coated with a heat-fusible ink, and heat generated by current-conduction is supplied to the ink to thereby effect recording as in the above JP-B 59-40627, a high electric power is required and it has been difficult to obtain a fine or precise image.

In order to remove the above disadvantage of the thermal transfer method, our research group has proposed a novel recording method which has solved the above-mentioned problems and realized a low recording cost (Japanese Patent Application No. 175191/1986, corresponding to U.S. patent application Ser. No. 075,045).

This recording method comprises:

providing a fluid ink which is capable of forming a fluid layer, substantially non-adhesive and capable of being imparted with an adhesiveness on application of an energy, forming a layer of the fluid ink on an ink-carrying member, applying a pattern of the energy corresponding to a given image signal to the ink layer to form an adhesive pattern of the ink, and transferring the adhesive pattern of the ink to a transfer-receiving medium to form thereon an ink pattern corresponding to the energy pattern applied.

In the above-mentioned new type of recording method, when a fluid ink having a crosslinked structure (i.e., one in a gel form, in a broad sense) is used, image deformation at an energy application position is considerably reduced because of the elastic property of the ink based on gel elasticity.

The above-mentioned new type of recording method utilizes oxidation-reduction at an electrode as a recording mechanism, similarly as in the conventional electrolytic recording method. However, the above-mentioned recording method is novel and has various advantages as follows:

(1) The new method is mainly based on the application of an adhesiveness (e.g., that due to sol-gel phase transition in the ink) caused by electric conduction, but is not based on color formation caused thereby. Therefore, it provides an image having higher stability and durability than that based on the chemical color formation.

(2) In the new method, a paper preliminarily coated with a developer is not used, but the ink is ordinarily applied onto an ink-carrying member and used repeatedly while only a portion of the ink actually contributing to image formation is transferred to a transfer-receiving medium. Accordingly, the above new method may use plain paper as the transfer-receiving medium and only requires low running costs.

(3) The new method only requires an application voltage and an application current which are much smaller than those in the conventional electrolytic recording method which requires an electric charge amount of one faraday in order to generate one chemical equivalent of the colored substance. For example, typically, the new method requires a voltage of about 10 V and a current of about 1 mA per one pixel (100 microns$\times$100 microns) and may easily be applied to a high speed recording corresponding to a pulse duration of about 1 msec.

(4) In view of the above point (3), the new method can effect a line-sequential recording on plain paper by using a line head having a highly fine electrode pattern (8 lines/mm-16 lines/mm) which cannot have been used in the conventional electrolyte recording method.

Further, our research group has proposed, as an ink used for the above-mentioned new image recording method, an image recording ink comprising: a liquid dispersion medium, and a crosslinked substance impregnated with the liquid dispersion medium; the ink being capable of being imparted with an adhesiveness on application of an electric current; the ink containing an electrolyte capable of imparting a pH buffer action thereto (U.S. patent application Ser. No. 156,978 corresponding to Japanese Patent Application Nos. 36904/1987, 15241/1988 and 15242/1988).

In order to further improve the practical characteristic (e.g., storage stability) of the fluid ink to be used in the above new image recording method while suitably retaining the image recording characteristic thereof, there has still been room for improvement with respect to a liquid dispersion medium as well as a crosslinked substance used in the ink.

SUMMARY OF THE INVENTION

An object of the present invention is to provide an ink suitably used in the above new type of image recording method which has solved the above-mentioned problems of the conventional recording systems.

Another object of the present invention is to provide a type of ink which can be used up without disposal as far as it has not been actually used for recording or without using an ink ribbon or ink sheet to be disposed after use as in the conventional thermal transfer system.

A further object of the present invention is to provide an ink having a fluidity which is not attached or transferred to a transfer-receiving medium comprising an intermediate transfer medium or a recording medium (final transfer medium) when it only contacts such a medium, and which can be used without being applied as a thin solid ink layer on a support unlike a solid ink held on a conventional ink ribbon or ink donor film.

A still further object of the present invention is to provide an ink which is excellent in a fluid layer-forming property, an extremely important factor in the above-mentioned novel image recording method utilizing the control of ink adhesiveness, and which can control its adhesiveness sharply, sensitively and stably under energy application.

A still further object of the present invention is to provide an ink excellent in storage stability and stability of performances during successive use, i.e., an ink which shows very little characteristic change due to drying, etc., and suitably retains its fluidity, etc., when left standing in the air for a long period.

A still further object of the present invention is to provide an ink capable of showing good transferability to an intermediate transfer medium or a recording medium under energy application.

A still further object of the present invention is to provide an ink capable of providing an image with good printing quality and image quality on a recording medium.

A still further object of the present invention is to provide an ink excellent in fixability to a recording medium.

A still further object of the present invention is to provide an ink capable of showing good storability and having a long life without decay, deterioration, discoloration, separation, or decomposition.

A still further object of the present invention is to provide an ink excellent in energy efficiency, which is capable of providing a good recorded image under the application of small quantity of energy.

We have diligently studied on a liquid dispersion medium which is not only capable of imparting a suitable balance between adhesiveness and non-adhesiveness to a fluid ink, but also is capable of enhancing the storage stability thereof. As a result of earnest study, we have found that an organic solvent having a specific relative dielectric constant, in combination with a crosslinked substance retaining it, is not only advantageous to an inorganic solvent such as water in view of storage stability, but also provides a fluid ink capable of controlling its adhesiveness sensitively corresponding to electric conduction.

The image recording ink according to the present invention is based on the above discovery and comprises: a liquid dispersion medium, and a crosslinked substance impregnated with the liquid dispersion medium, the ink being capable of causing a change in adhesiveness thereof by an electrochemical reaction, wherein the liquid dispersion medium comprises an organic solvent having a relative dielectric constant of 15 or larger at 25° C.

In the above image recording ink of the present invention, it is assumed that the above-mentioned organic solvent having a specific relative dielectric constant not only provides a suitable fluidity (or viscoelasticity) to the ink on the basis of the interaction with the crosslinked substance retaining it, but also provides a good energy efficiency to the fluid ink on the basis of the ionic conductivity thereof.

These and other objects, features and advantages of the present invention will become more apparent upon a consideration of the following description of the preferred embodiments of the present invention taken in conjunction with the accompanying drawings, wherein like reference numerals denote like parts. In the following description, "%" and "part(s)" representing a quantitative proportion or ratio are by weight unless otherwise noted specifically.

DETAILED DESCRIPTION OF THE INVENTION

The image recording ink according to the present invention comprises a liquid dispersion medium and a crosslinked substance impregnated therewith.

In the present invention, it is possible to reduce the adhesiveness of the ink by electric conduction thereby to form an image. For example, it is possible to patternwise convert the ink of the present invention in a sol-state based on pH adjustment, etc., to a gel state under electric conduction. However, it is preferred that the ink of the present invention is one which is substantially non-adhesive and capable of being imparted with an adhesiveness under electric conduction, in order to suppress the quantity of a pattern energy or the ink consumed at the time of image formation.

The term "adhesiveness" used herein is a selective one and refers to a property of the ink by which a portion of the ink contacting an object such as transfer-receiving medium is selectively separated or cut from the ink body to adhere to the object. Thus, the "adhesiveness" is not concerned with whether the ink body is glutinous or not.

In the above-mentioned preferred embodiment of the present invention, the ink is one in the form of a gel, in a broad sense, which comprises a liquid dispersion medium (or vehicle) comprising an organic solvent with a specific relative dielectric constant, and a crosslinked substance such as a water-soluble (or hydrophilic) polymer impregnated with the liquid dispersion medium.

Hereinbelow, the ink in such preferred embodiment will mainly be described.

The above-mentioned "crosslinked substance" refers to a single substance which per se can assume a cross-linked structure, or a mixture of a substance capable of assuming a crosslinked structure with the aid of an additive (such as a crosslinking agent for providing a crosslinking ion such as borate ion), and the additive. Further, the term "cross-linked structure" refers to a three-dimensional structure having a cross-linkage or crosslinking bond.

More specifically, the ink of the present invention may preferably be one satisfying the following properties.

(1) Fluidity

When measured by means of a rotational viscometer, e.g., Vismetron Model VS-A1, mfd. by Shibaura System K.K. with a stainless steel (SUS 27) rotor of about 3 mm in diameter at normal temperature (25°), the ink of the present invention should preferably show a viscosity of $1.0\times10^4$–$2.0\times10^6$ centipoises (cps), particularly $1.0\times10^5$–$1.0\times10^6$ cps at a rotor speed of 0.3 rpm; and $5.0\times10^3$ cps or more particularly $1.0\times10^4$–$4.0\times10^5$ cps at a rotor speed of 1.5 rpm.

Figure 1:
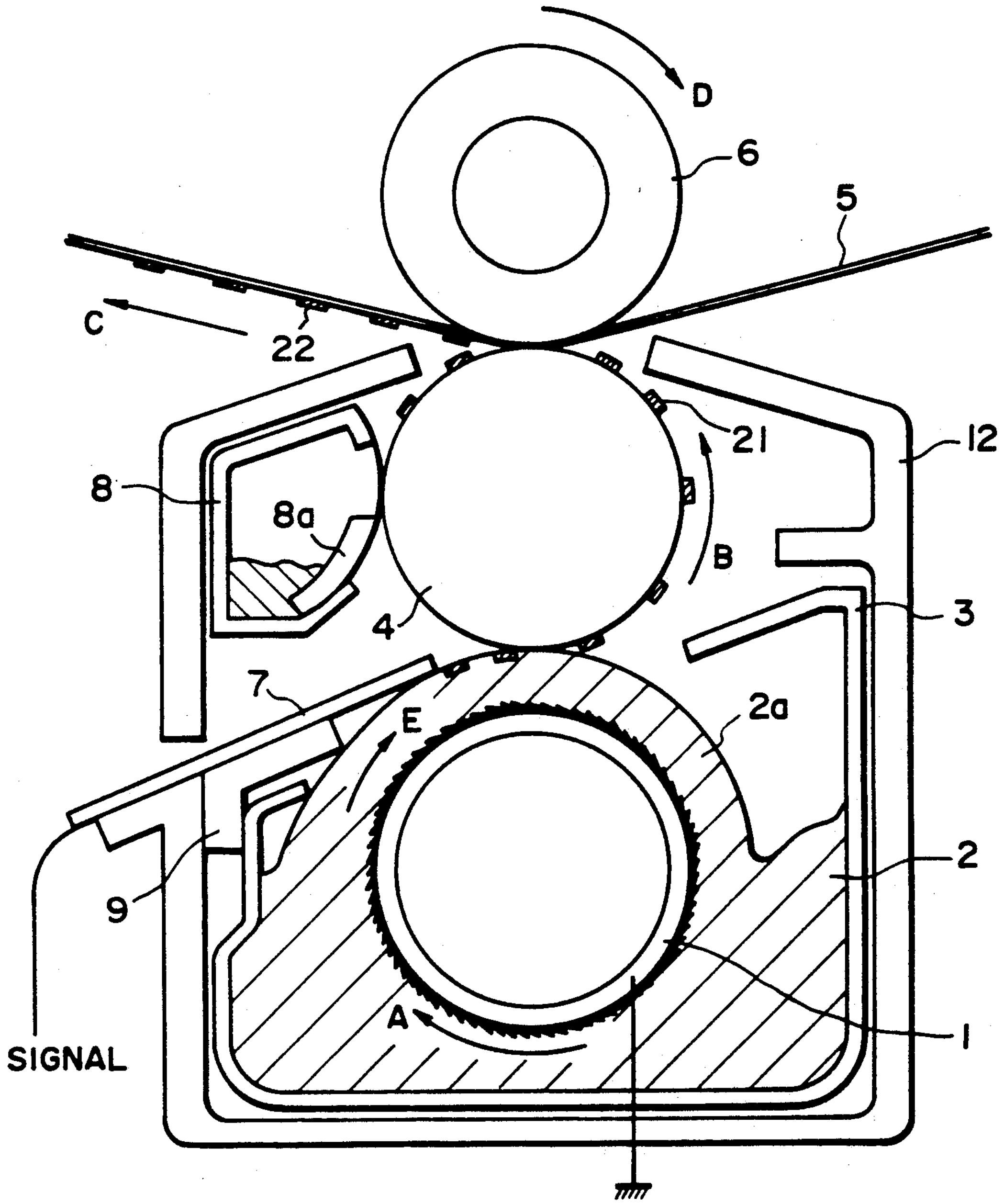
FIGS. 1 and 2 are respectively a schematic sectional view of an apparatus for practicing a recording method using the image recording ink of the present invention.

Incidentally, the above-mentioned fluidity is preferred when the ink is used in an image recording apparatus as shown in FIG. 1, as described hereinafter, having an ink layer thickness-regulation means comprising a blade. If the method of conveying or carrying the ink is changed, the ink having a viscosity larger than the above range can suitably be used.

If the fluidity (or fluid layer-forming property) of the ink is lower than the above range, smooth supply of the ink sometimes becomes difficult, or heating, etc., is sometimes required for the ink supply, in a case where a blade coating method is used as shown in FIG. 1.

Figure 2:
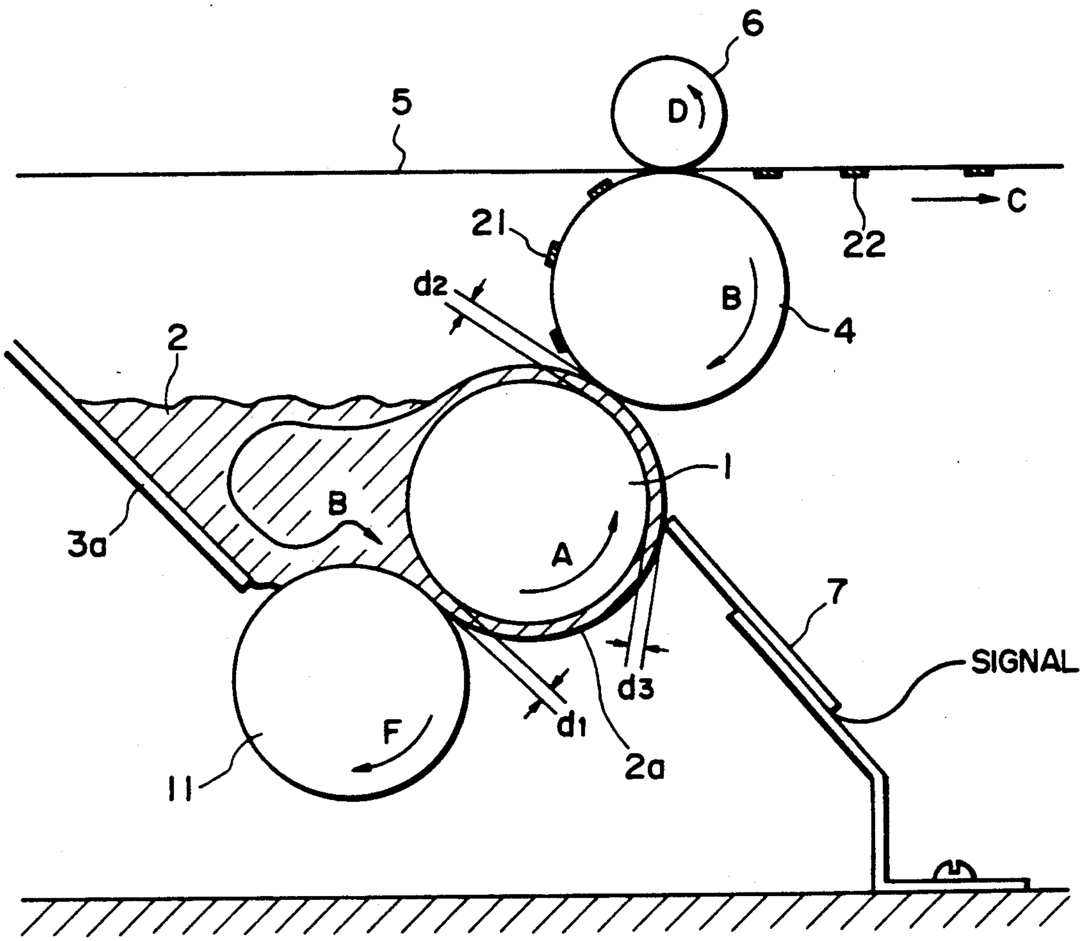
Figure 3:
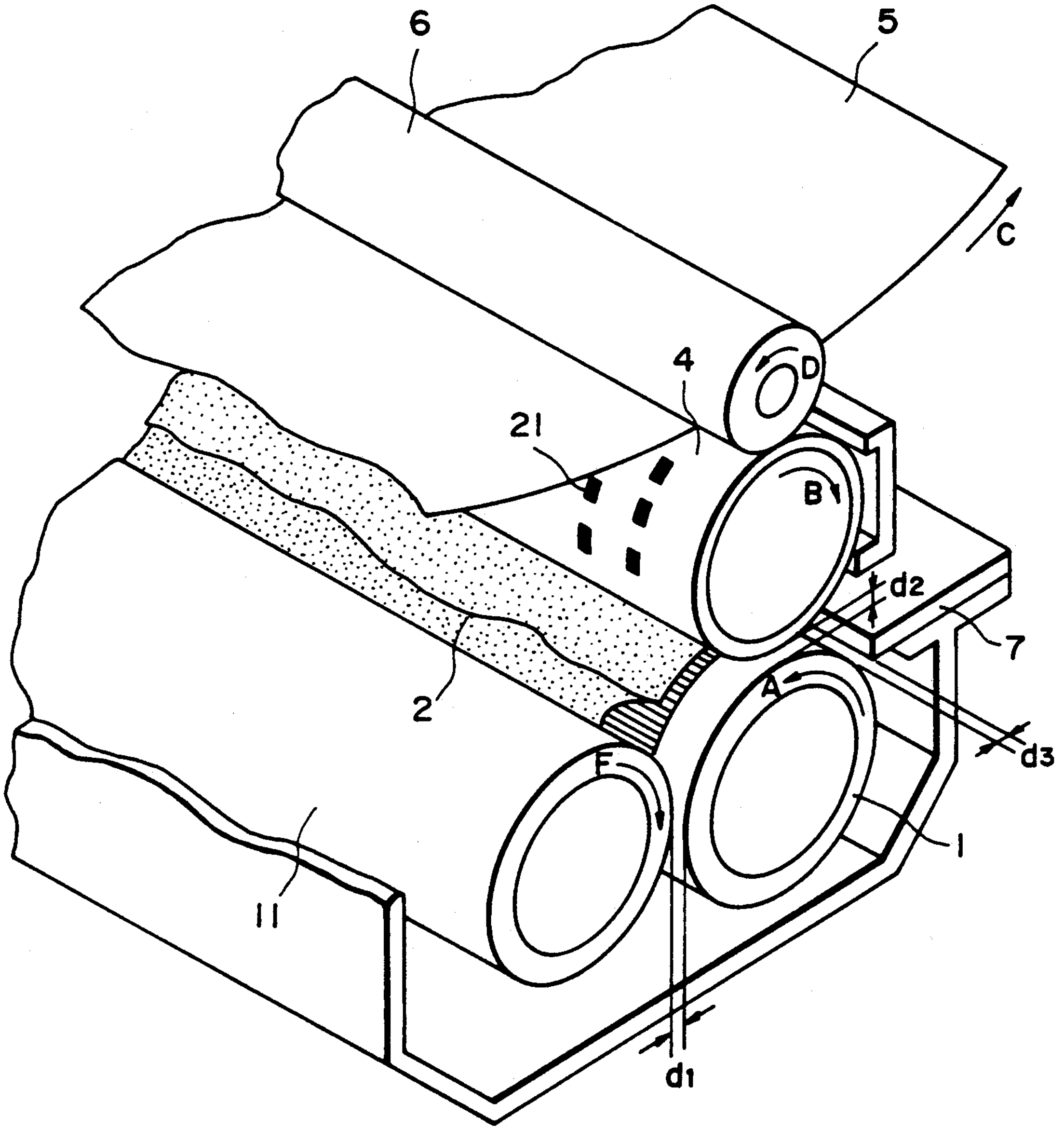
FIG. 3 is a perspective view of the recording apparatus shown in FIG. 2.

On the other hand, in a case where an ink layer is formed by coating, e.g., by means of an ink application roller as shown in a schematic sectional view of FIG. 2 (or in a schematic perspective view of FIG. 3), there may suitably be used an ink having a viscosity in a broader range than that mentioned above. In such case, it is preferred to measure the viscoelasticity of the ink rather than the viscosity thereof alone. More specifically, an ink is formed into a disk shape having a diameter of 25 mm and a thickness of 2 mm, and a sine strain with an angular velocity of 1 rad/sec is applied to the ink sample at 25° C. by means of Rheometer RMS-800 (mfd. by Rheometrics Inc., U.S.A.). In such case, the ink of the present invention may preferably show a ratio (G"/G') of a loss elasticity modulus (G") to a storage elasticity modulus (G') of 0.1–10.

Incidentally, it is possible to refer to a preceding application filed by our research group (Japanese Patent Application No. 131586/1987, corresponding to U.S. patent application Ser. No. 199,452), with respect to the detail of the viscoelasticity characteristics of the ink.

(2) Non-adhesiveness (or liquid dispersion medium-retaining ability)

On the surface of a sample fluid ink held in a container, an aluminum foil of 5 cm×5 cm in size is, after being accurately weighed, placed gently and is left standing as it is for 1 min. in an environment of a temperature of 25° C. and a moisture of 60%. Then, the aluminum foil is gently peeled off from the surface of the fluid ink and then quickly weighed accurately to measure the increase in weight of the aluminum foil. Through the measurement, the ink of the present invention should preferably show substantially no transfer of its solid content (e.g., crosslinked substance) and a weight increase of the aluminum foil of less than 1000 mg, particularly on the order of 1–100 mg. In the above measurement, it is possible to separate the aluminum foil from the fluid ink body, if necessary, with the aid of a spatula.

If the non-adhesiveness of the ink is insufficient in the light of the above standard, not only the liquid dispersion medium but also the crosslinked substance of the ink can transfer to a transfer-receiving medium to a practically non-negligible extent even under no energy application, thus resulting in a lower image quality.

Further, in such case, a relatively large amount of the liquid dispersion medium is liable to transfer to the transfer-receiving medium and it is troublesome to remove the liquid dispersion medium.

As described above, the ink according to the present invention may preferably be an ink in the form of a gel, in a broad sense, comprising a crosslinked substance impregnated with a liquid dispersion medium, more preferably, an ink in the form of a sludge obtained by dispersing particles having a particle size of preferably 0.1–100 microns, further preferably 1– 20 microns, in the above-mentioned gel ink.

It is presumed that the ink of the present invention is not substantially transferred to a transfer-receiving medium because the liquid dispersion medium except for a minor portion thereof is well retained in the crosslinked structure.

It is also presumed that when an energy such as electric energy is patternwise imparted to the gel ink, the crosslinked structure is changed thereby, so that the fluid ink is imparted with an adhesiveness in a pattern.

In an image recording method using the ink of the present invention, when nearly 100% of the ink portion provided with adhesiveness is not transferred to a transfer-receiving medium or intermediate transfer medium, or a final transfer medium (i.e., a recording medium), i.e., when an ink which remains on an ink-carrying member or an intermediate transfer member described hereinbelow after a prescribed transfer thereof is not negligible in practice, it is preferred that the above-mentioned change in crosslinked structure, etc., is a reversible one.

Further, it is preferred that the ink substantially retains the change in the crosslinked structure, etc., during the period from the time at which it is supplied with an energy as described below, to the time at which it is transferred to a transfer-receiving medium.

In the ink of the present invention, the kind, amount, etc., of the crosslinked substance is not particularly limited as long as it can provide an ink having the above-mentioned characteristic, but the crosslinked substance may preferably comprise a hydrophilic (or water-soluble) high polymer or macromolecular substance, in view of the safety in the liquid dispersion medium to be combined therewith.

Examples of such a hydrophilic high polymer include: plant polymers such as guar gum, locust bean gum, gum arabic, tragacanth, carrageenah, pectin, mannan, and starch; microorganism polymers such as xanthane gum, dextrin, succinoglucan, and curdran; animal polymers such as gelatin, casein, albumin, and collagen; cellulose polymers such as methyl cellulose, ethyl cellulose, and hydroxyethyl cellulose, starch polymers such as soluble starch, carboxymethyl starch, methyl starch; alginic acid polymers such as propylene glycol alginate, and alginic acid salts; other semi-synthetic polymers such as derivatives of polysaccharides; vinyl polymers such as polyvinyl alcohol, polyvinylpyrrolidone, polyvinyl methyl ether, carboxyvinyl polymer, and polysodium acrylate; and other synthetic polymers such as polyethylene glycol, and ethylene oxide-propylene oxide block copolymer. These polymers may be used singly or in mixture of two or more species, as desired. Among these, guar gum or polyvinyl alcohol may particularly preferably be used, in view of a suitable balance between adhesiveness and non-adhesiveness.

The above-mentioned hydrophilic polymer may preferably be used in a proportion of 0.2–50 parts, more preferably 0.5–20 parts, particularly preferably 0.5–5 parts, with respect to 100 parts of the liquid dispersion medium.

The liquid dispersion medium constituting the image recording ink of the present invention in combination with the above crosslinked substance comprises an organic solvent (i.e., liquid organic compound) having a relative dielectric constant of 15 or above, preferably 30–200, at 25° C.

If an organic solvent having a relative dielectric constant outside the above range is used, a recorded image of good quality cannot be obtained stably. More specifically, if an organic solvent having a relative dielectric constant of below 15 at 25° C. is used, a change in the crosslinked structure does not occur sensitively, whereby there occurs only an insufficient change in adhesiveness or no change in the crosslinked structure. As a result, it is difficult to selectively transfer the ink to a transfer-receiving medium.

Accordingly, such ink only provides a very unclear or not recorded image, whereby an image of good quality cannot be obtained. Incidentally, even if an image of a certain image quality is obtained, an excessive energy is required to lower the energy efficiency. Further, an electrode used for the image formation is liable to deteriorate, and the image recording apparatus cannot perform satisfactorily.

The relative dielectric constant used herein is an important factor determining ionic conductivity in a solvent. Since the force (F) exerted between ions is represented by the following formula, a solvent having a high relative dielectric constant provides a high ionic conductivity:

$$F = Q_1 \cdot Q_2 / (4\pi\epsilon_0\epsilon_r r^2) \quad (I),$$

wherein $Q_1$ and $Q_2$ respectively denote charges of the ions, $\epsilon_0$ denotes a dielectric constant of empty space, $\epsilon_r$ denotes a relative dielectric constant, and r denotes the distance between the ions.

Accordingly, when an electric energy is applied to an ink comprising a solvent having a relative dielectric constant of 15 or larger as a dispersion medium, an electrochemical reaction is sensitively caused to change the crosslinked, structure whereby selective transfer and recording may be effected.

Examples of the organic solvent suitably used in the present invention may include: hydrophilic solvents such as N-methylacetamide, N-methylformamide, formamide, ethylene carbonate, acetamide, succinonitrile, dimethyl sulfoxide, sulfolane, glycerin, 1,2-ethanediol (ethylene glycol), furfuryl alcohol, N,N-dimethylacetamide, N,N-dimethylformamide, nitrobenzene, N-methylpyrrolidone, 1,2-propanediol (propylene glycol), diethylene glycol, 2-ethoxyethanol, hexamethylphosphoric triamide, 2-nitropropane, nitroethane, γ-butyrolactone, propylene carbonate, triethylene glycol, 1,2,6-hexanetriol, dipropylene glycol and hexylene glycol. As a matter of course, the organic solvent used in the present invention should not be restricted to these specific examples.

Among these, polyhydric alcohols (particularly, glycol-type solvents), or derivatives thereof such as ether or ester derivatives may particularly preferably be used in view of the safety and/or chemical stability of the solvent per se.

In the present invention, in order to suppress a change in the ink characteristic which can be caused by drying, etc. in the storage of the ink, the above-mentioned organic solvent having a relative dielectric constant of 15 or larger may preferably have a (saturation) vapor pressure of 21 mmHg or smaller, more preferably 13 mmHg or smaller, at 25° C.

In a case where an organic solvent having a vapor pressure of above 21 mmHg at 25° C. is used for the dispersion medium of the ink, when the ink is left standing in the air for a period of about several months to one year, such solvent vaporizes and the ink viscosity increases, whereby the application thereof onto an ink-carrying member, etc., becomes difficult to some cases.

In the present invention, the organic solvent having a relative dielectric constant of 15 may preferably be contained in the ink in an amount of 10 -99 wt. %, more preferably 30–95 wt. %, based on the total weight of the ink.

In the present invention, as the liquid dispersion medium, the organic solvent having a relative dielectric constant of 15 or larger may be used singly or as a mixture of two or more species. Further, as desired, such organic solvent may be used as a mixture with an inorganic solvent (such as water), or as a mixture with a liquid having a relative dielectric constant of below 15.

When a mixture comprising the above-mentioned organic solvent is used as the liquid dispersion medium, this mixture per se may preferably have a relative dielectric constant of 15 or above. Further, the organic solvent having a relative dielectric constant of 15 or above may preferably be contained in an amount of 10 parts or more, more preferably 30 parts or more, particularly preferably 50 parts or more, in 100 parts of the above-mentioned mixture.

In the present invention, there may particularly preferably be used a liquid dispersion medium comprising water, a glycol-type solvent (preferably having a relative dielectric constant of 20–45), and an organic solvent having a relative dielectric constant of 80 or larger (more preferably 140 or larger) at 25° C. The water contained in the liquid dispersion medium suitably provides a film-forming property to the ink and facilitates a sensitive recording under low-energy application. Further, when the organic solvent having a relative dielectric constant of 80 or larger at 25° C. is contained in the liquid dispersion medium, the electric conductivity of the ink may be increased and the ink may retain good sensitivity even when the water is vaporized.

Preferred examples of the organic solvent having a relative dielectric constant of 80 or above used in the present invention may include: N-methylacetamide (relative dielectric constant at 25° C. =191.3), N-methylformamide (ditto, 182.4), N-methylpropionamide (ditto, 172.2), ethylene carbonate (ditto, 89.6), etc. These organic solvents may be used singly or as a mixture of two or more species. In a case where a mixture of two or more species of the organic solvents is used, the entire mixture of the organic solvents may preferably have a relative dielectric constant of 80 or larger at 25° C.

On the other hand, preferred examples of the above-mentioned glycol-type solvent may include: propylene glycol, ethylene glycol, diethylene glycol, trimethylene glycol, dipropylene glycol, hexylene glycol, 1,2,6-hexanetriol, tetraethylene glycol, polypropylene glycol, glycerin, etc.

In such embodiment, the liquid dispersion medium may preferably comprise: 10–35 parts (more preferably 15–25 parts) of water, 40–70 parts (more preferably 50–60 parts) of a glycol-type solvent, and 5–40 parts (more preferably 10–30 parts) of an organic solvent having a relative dielectric constant of 80 or above. Further, the liquid dispersion medium may more preferably comprise: 100–350 parts (particularly 200–300 parts) of a glycol-type solvent, and 40–120 parts (particularly 60–100 parts) of an organic solvent having a relative dielectric constant of 80 or above, per 100 parts of water.

If the amount of water is too small, the electric resistivity of the ink increases and the sensitivity thereof decreases to lower image density. On the other hand, if the amount of water is too large, non-selective transfer of the ink can occur.

If the amount of the glycol-type solvent is too small, the viscosity of the ink increases and the application thereof onto an ink-carrying member becomes difficult in some cases. If the amount of the glycol-type solvent is too large, the ink viscosity decreases and the surface of the ink is liable to be disturbed by a recording electrode in contact therewith, thereby to invite a decrease in the resultant image quality.

Further, if the amount of the organic solvent having a relative dielectric constant of 80 or larger is too small, sensitivity decrease in the ink due to water vaporization cannot be prevented sufficiently, and the resultant image density is lowered when the ink is used for a long period. If the amount of the above organic solvent is too large, the ink cannot be suitably applied onto an ink-carrying member.

The crosslinked substance used in the present invention can form a crosslinked structure by itself e.g., based on its polymer characteristic, but can be used in combination with a crosslinking agent (or gelling agent) for more positively crosslinking the crosslinked substance in order to improve the ink characteristics when supplied with or not supplied with energy.

A preferred class of the crosslinking agent may be ionic crosslinking agents, including: various salts such as $CuSO_4$; boric acid source compounds capable of generating borate ions in water, such as borax and boric acid. When such an ionic crosslinking agent is used, it becomes easy to selectively provide the ink with an adhesiveness through an electrochemical reaction involving transfer of electrons or a pH change. As a result, the use of such an ionic crosslinking agent is preferred in order to suppress the consumption of pattern energy. The ionic crosslinking agent may preferably be used in a proportion of 0.05-3 parts, particularly 0.1-1.5 parts, per 100 parts of the crosslinked substance.

Instead, a crosslink agent utilizing a crosslinking bond such as glyoxal or dialdehydebenzene can also be used.

In the present invention, in order to adjust the pH of the ink, there may appropriately be added a strong or weak alkali such as NaOH, KOH and $Na_2CO_3$, in a case where an alkaline component is used.

Further, in order to adjust the conductivity of the ink at the time of energy application, a salt such as NaCl, LiCl, and KCl may be added thereto.

Further, in order to adjust the viscoelasticity of the ink, fine powder filler such as silica and carbon black may appropriately be added thereto.

The ink according to the present invention, on application of a pH change due to electric conduction, is at least partially subjected to a change in or destruction of the crosslinked structure to be reversibly converted into a sol state, whereby it is selectively imparted with an adhesiveness corresponding to the energy application pattern.

According to our knowledge, e.g., when a polyvinyl alcohol crosslinked with borate ions is used as the crosslinked substance, the change in the crosslinked structure caused by a pH change may be considered as follows.

Thus, when the borate ion bonded to the —OH group of the polyvinyl alcohol,

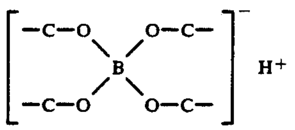

is subjected to an anodic reaction in the vicinity of an anode under electric conduction (or the addition of an electron acceptor such as hydrochloric acid), the pH of the ink is changed to the acidic side and electrons may be removed to destroy at least a part of the crosslinked structure, whereby the ink may be imparted with an adhesiveness selectively or imagewise. The reaction at this time may presumably be expressed by the following formula:

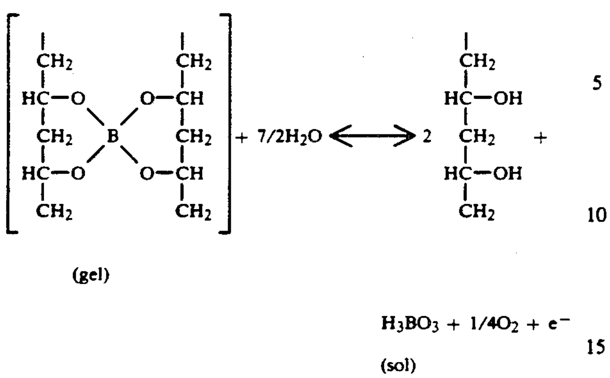

The above-mentioned sol-gel transition may be caused by a pH change, and the gelation is promoted along with a pH increase and the solation is promoted along with a pH decrease, while it varies depending on the polymerization degree or saponification degree of the polyvinyl alcohol, and the amount of the boric acid.

The image recording ink according to the present invention preferably comprises a liquid dispersion medium and a crosslinked substance, as described above, and may further comprise, as desired, a colorant inclusive of dye, pigment and colored fine particles, a color forming compound capable of generating a color on electric conduction, an electrolyte providing a desired electroconductivity to the ink, or another additive such as an antifungal agent or an antiseptic.

The colorant or coloring agent may be any of dyes and pigments generally used in the field of printing and recording, such as carbon black. Among these, a dye or pigment, particularly a pigment, having a relatively low affinity to the liquid dispersion medium is preferably used in order to suppress the coloring of a transfer-receiving medium, i.e., the intermediate transfer medium or a recording medium, due to the transfer thereto of the liquid dispersion medium under no electric conduction. The pigment or dye may preferably be used in a proportion of 0.1 part or more, more preferably 1-30 parts, particularly 1-10 parts, per 100 parts of the liquid dispersion medium.

Further, the colorant may be in the form of fine colored particles, like a toner of various colors for electrophotography, obtained by dispersing a pigment or dye as described above in a natural or synthetic resin and forming the dispersion into fine particles. An ink containing such colored particles behaves like a dilatent liquid and is particularly preferred in respect of suppressing the transfer of the liquid dispersion medium to or coloring of the transfer-receiving medium under no electric conduction.

The colored fine particles may preferably be used in a proportion of 1 part or more, further preferably 5-100 parts, particularly preferably 20-80 parts, per 100 parts of the liquid dispersion medium. Generally speaking, it is preferred that colored particles having a large size are incorporated in a higher proportion in order to provide a better coloring characteristic. Incidentally, in the present invention, the above toner particles can be used regardless of the electrophotographic characteristic thereof such as chargeability.

The colorant inclusive of the pigment or the colored fine particles may preferably have a particle size of 0.01-100 microns, particularly 0.01-20 microns.

If the particle size is below 0.01 micron, the colorant particles are not retained in the crosslinked structure but are transferred together with a minor portion of the liquid dispersion medium even when the ink contacts the intermediate transfer medium or the recording medium under no electric conduction, whereby an image fog is liable to result. On the other hand, if the particle size exceeds 100 microns, a resolution required for an ordinary image is not satisfied.

The image recording ink according to the present invention may be obtained from the above components, for example, by uniformly mixing a liquid dispersion medium such as water, a crosslinked substance, and also an optional additive such as a crosslinking agent, a colorant, an electrolyte, etc., under heating as desired, to form a viscous solution or dispersion, which is then cooled to be converted into a gel.

Incidentally, when colored particles such as toner particles are used as a colorant, it is preferred that a crosslinked substance and a liquid dispersion medium are first mixed under heating to form a uniform liquid, and then the colored particles are added thereto. In this case, it is further preferred that the addition of the colored particles is effected in the neighborhood of room temperature so as to avoid the agglomeration of the particles.

Then, there is described a method of applying an electric current to the ink of the present invention.

In a case where a pH change is imparted to the ink by using an electrode, the pH change does not diffuse three-dimensionally like heat, but selectively diffuses in the direction of the ink depth (i.e., in the direction of the current), whereby the clearness of the resultant ink pattern (e.g., sharpness and image quality) may be enhanced.

Incidentally, when a recording is effected by using a pH change based on electric conduction, the anode material can be dissolved due to electrolysis. Accordingly, when the recording electrode is an anode, it is preferred to use an inert metal such as platinum, as the material for the recording electrode. In such case, however, fine or micro fabrication such as photolithoetching is required. As a result, e.g., by using electron-beam deposition or sputtering, the production cost relatively tends to increase.

On the other hand, in a case where the recording electrode is a cathode, the above-mentioned fine fabrication is not required whereby the production cost may preferably be reduced. As the ink which can be used in such cathodic recording, there may preferably be used an ink comprising a peptide compound such as a protein, and an aqueous dispersion medium, wherein the initial or unused pH value is higher than the isoelectric point of the peptide compound, e.g., by adding an aqueous alkaline solution thereto.

Hereinbelow, there will be described an embodiment of the image recording method using the image recording ink of the present invention as described above.

Referring to FIG. 1 which is a schematic sectional view taken across the thickness of a recording medium showing an embodiment of the recording apparatus used in such recording method, an ink-carrying roller 1 having a surface of stainless steel, etc., within an ink container 3 for holding therein an ink 2 of the present invention so that it rotates in the direction of an arrow A while carrying the ink 2.

Above the ink-carrying roller 1 at an ink transfer position, there is disposed, with a certain gap from the surface (i.e., the ink-carrying face) of the ink-carrying roller 1, an intermediate transfer roller 4 as an intermediate transfer medium which is composed of, e.g., a cylinder of iron coated with a hard chromium plating, and rotates in the direction of an arrow B. The intermediate transfer roller 4 is disposed so that the surface thereof may contact a layer 2*a* of the ink 2 formed on the ink-carrying roller 1.

On the other hand, at an ink pattern transfer position, a recording medium 5 of, e.g., plain paper is disposed in contact with the surface of the intermediate transfer roller 4 (i.e., the surface on which an ink pattern is to be formed) and is conveyed in an arrow C direction. Further, so as to movably sandwich the recording medium 5 with the intermediate transfer roller 4, a platen roller 6 having a surface of silicone rubber, etc., and rotating in an arrow D direction is disposed opposite to the intermediate transfer roller 4.

Above the ink-carrying roller 1 at a position upstream from the ink transfer position where the ink-carrying roller 1 and the intermediate transfer 4 are disposed opposite to each other, a recording electrode 7 as a means for applying an energy corresponding to a given signal is disposed with a certain spacing from the surface of the roller 1. The tip of the electrode 7 provided with an electrode element is disposed so that it can contact the layer 2*a* of the ink 2 formed on the ink-carrying roller 1.

Then, there will be described the operation of the recording apparatus having the above-mentioned basic structure.

Incidentally, in the present invention, it is possible to selectively transfer a portion of the ink 2 not supplied with an energy to the intermediate transfer roller 4, e.g., by imparting a pulse in a reverse direction to the recording electrode 7. Hereinbelow, however, there will be described a preferred embodiment wherein a portion of the ink 2 supplied with an energy is selectively transferred to the intermediate transfer roller 4.

Referring again to FIG. 1, the ink 2 in the ink container 3 is one according to the present invention which is substantially non-adhesive and can be imparted with an adhesiveness under electric conduction. The ink 2 is carried on the ink-carrying roller 1 as in ink layer 2*a* and conveyed in an arrow E direction along with the rotation in the arrow A direction of the roller 1.

The fluid ink 2 moved in this way is supplied with a pattern of voltage corresponding to an image signal from the recording electrode 7 at an energy application position where the ink 2 contacts the electrode 7. A current corresponding to the voltage flows between the recording electrode 7 and the ink-carrying roller 1 through the ink 2, whereby the ink 2 is selectively imparted with an adhesiveness, e.g., because of a change in crosslinking structure through an electro-chemical reaction in the ink 2.

A portion of the ink 2 selectively imparted with an adhesiveness is further moved in the arrow E direction to reach the ink transfer position where the intermediate transfer roller 4 contacts the ink 2, and the at least a portion of the ink 2 constituting the ink layer 2*a* is transferred onto the intermediate transfer roller 4 rotating in the arrow B direction, on the basis of the above-mentioned adhesiveness, thereby to form an ink pattern 21 thereon.

The ink pattern 21 is then conveyed along with the rotation in the arrow B direction of the intermediate transfer roller 4 to reach the ink pattern-transfer position where the roller 4 confronts the platen roller 6 by the medium of the recording medium 5. At the ink pattern-transfer position, the ink pattern 21 formed on the intermediate transfer medium 4 is transferred to the recording medium 5 under a pressure exerted by the platen 6 thereby to form a transferred image 22.

Further, it is also possible to dispose a known fixing means (not shown) as by heating or pressing, downstream of the ink pattern-transfer position in order to ensure the fixation of a transfer-recorded image 22 formed on the recording medium 5. Further, the ink remaining on the intermediate transfer roller 4 after the transfer of the ink pattern 21 to the recording medium 5, may for example be removed, e.g., by a cleaning means 8 including a blade 8*a* for scraping the ink in contact with the intermediate transfer roller 4.

On the other hand, the remainder of the ink 2 not transferred onto the intermediate transfer roller 4 at the above-mentioned ink transfer position is further moved in the arrow E direction and is separated from the intermediate transfer roller 4 by gravity, etc., because of its non-adhesiveness to be returned into the ink container 3 and reused because of its fluidity.

Incidentally, a somewhat negative shear force is applied at the point of separation between the intermediate transfer roller 4 and the ink layer 2*a*. For this reason, it is preferred to make the peripheral speed of the intermediate transfer roller 4 smaller than (or equal to) the peripheral speed of the ink-carrying roller 1 so as to apply to the ink layer 2*a* a shear force based on the difference in peripheral speed, in respect to stabilization of separation of the ink layer 2*a* and the intermediate transfer roller 4.

In a case where the ink 2 is in the form of a sludge ink, it is presumed that the ink is not substantially transferred to the intermediate transfer roller 4 because the particles contained therein are tightly aligned on the ink interface so that the contact of the dispersion medium to the intermediate transfer roller 4 is suppressed under no energy application.

In an embodiment wherein the ink is electrochemically supplied with an adhesiveness, when a crosslinked substance comprising guar gum crosslinked with borate ions is used, the amount of current required for breaking at least a part of the crosslinked structure is only such an amount as required for causing transfer of electrons from crosslinking borate ions which are generally used in a considerably small amount, e.g., on the order of several hundred ppm of the ink.

The above amount of current is almost 1/10 of the amount of current required by a thermal head, so that a low energy consumption recording may be effected by using such an electrochemical change.

Figure 4:
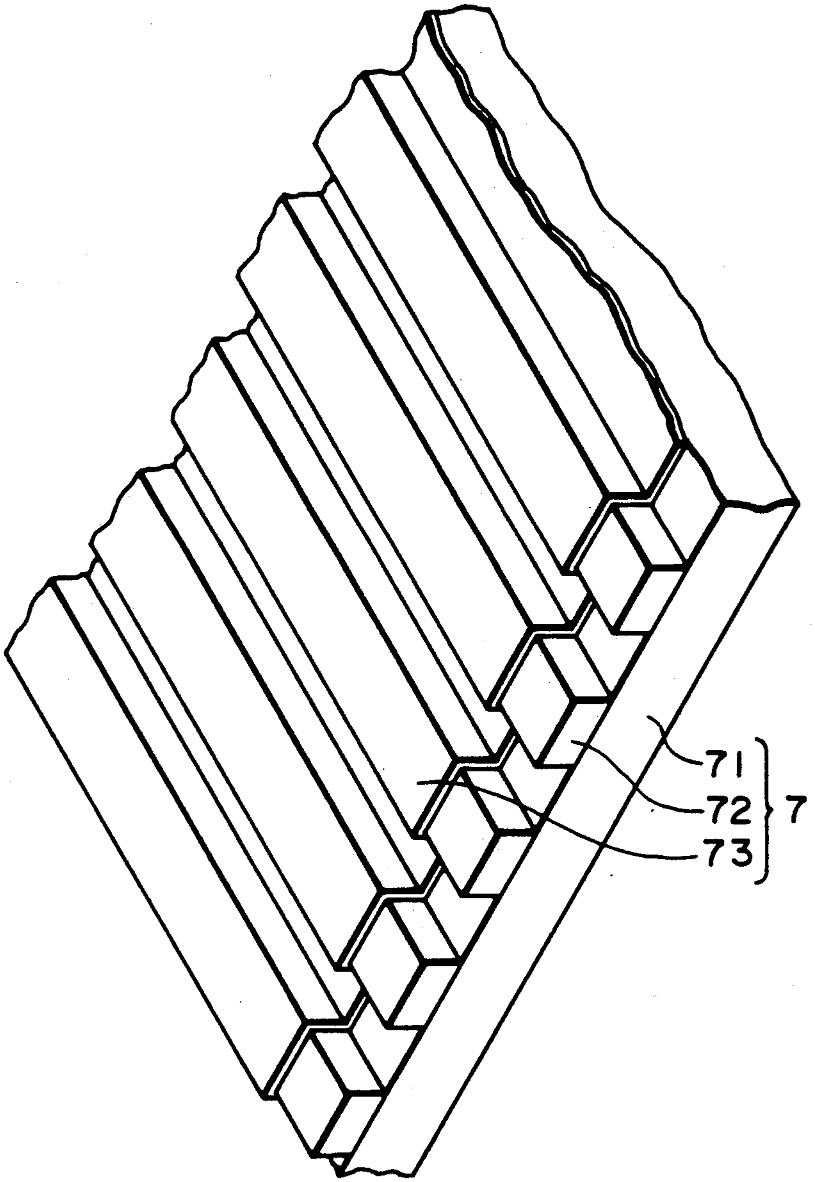
FIG. 4 is an enlarged partial perspective view of a recording electrode used in the above-mentioned recording apparatus.

FIG. 4 shows an embodiment of the recording electrode 7. With reference to FIG. 4 which is an enlarged partial perspective view, the recording electrode 7 may be obtained by forming a plurality of electrode elements 72 of a metal such as Cu on a substrate 71, and coating the electrode elements 72 except for the tip portions thereof contacting the ink with an insulating film 73 of polyimide, etc. The exposed tip portions of the electrode elements 72 may preferably be coated with a plating of Au, Pt, etc. In view of the durability, a Pt plating is preferred.

In an embodiment already explained with reference to FIG. 1, a current is passed between the recording electrode 7 and the ink-carrying roller 1, but it is also possible that a current is passed between an adjacent pair of the plurality of electrode elements 72 on the recording electrode 7.

In an embodiment shown in FIG. 2, an ink 2 is applied onto an ink-carrying roller 1 by a roller coating method. Referring to FIG. 2, there is provided an ink-holding member 3a being capable of holding therein an image recording ink 2. Below the ink-holding member 3a, i.e., on the side of an ink-supply part thereof through which the ink 2 can be flown, there is disposed an ink-application roller 11 for applying the ink 2 onto the ink-carrying roller 1, which is rotatable in the direction of an arrow F. The embodiment shown in FIG. 2 is substantially the same as that shown in FIG. 1 except that the image recording ink 2 is applied onto the ink-carrying roller 1 by means of the ink-holding member 3a and the ink application roller 11.

As described hereinabove, in the present invention, an organic solvent having a specific relative dielectric constant is used as an liquid dispersion medium. However, such organic solvent, especially one compatible with water, can absorb moisture contained in the air under a certain storage condition for an ink. Herein, "organic solvent compatible with water" refers to one having a property such that 100 parts thereof is uniformly mixable with 30 parts or more of water at 25° C.

For example, in a case where the ink obtained in Example 12 appearing hereinafter, which comprised ethylene glycol as an organic solvent compatible with water, and polyvinyl alcohol as a crosslinked substance, was left open to the air (25° C., 50% RH), the ink weight increased with the elapse of time as shown by a curve (a) in FIG. 5, and ink properties such as volume resistivity and viscoelasticity changed along therewith. When the ink was left standing in an airtight container, such phenomenon did not occur.

On the other hand, when an ink obtained in Comparative Example 4 appearing hereinafter was left open to the air, it showed a change in the ink weight as shown by a curve (b) in FIG. 5, and after it was left standing for one week (168 hours), the weight was substantially the same as that of the solid content thereof. The reason for this may clearly be considered that the water content in the ink is lost due to drying.

When the water content of the above-mentioned ink of Example 12, after being left standing in the air, was measured by using a Karl Fischer's reagent, it was found that substantially all of the above-mentioned weight increase was based on a water content. Accordingly, it was assumed that this weight increase was based on the absorption of water vapor in the air.

Incidentally, the ink of Example 12 may cause no problem in practice when it has been subjected to sufficient aging operation in production process therefor, e.g., by leaving it open in a room for about four days. however, such aging time ordinarily becomes a time loss in the production process. Further, in a case where such ink is commercially handled, the above-mentioned aging cannot occur because the ink is ordinarily stored in an airtight container.

Accordingly, in a case where the above-mentioned absorption of water content can cause a certain problem, it is preferred that in the production process for the ink, an organic solvent or a mixture of two or more species thereof having a low vapor pressure and a high dielectric constant may be selected as a dispersion medium, and the organic solvent is preliminarily mixed with an amount of water corresponding to an equilibrium water content. Such preliminary addition of water is preferred in order to considerably suppress a change in the ink characteristic based on moisture absorption or drying.

The "equilibrium water content" used herein refers to the water content in a mixture of an organic solvent and water which has been left open to the air at constant temperature and humidity to reach a certain equilibrium state wherein the vaporization of the water content of the mixture is in equilibrium with the absorption of the moisture of the air into the mixture.

Figure 6:
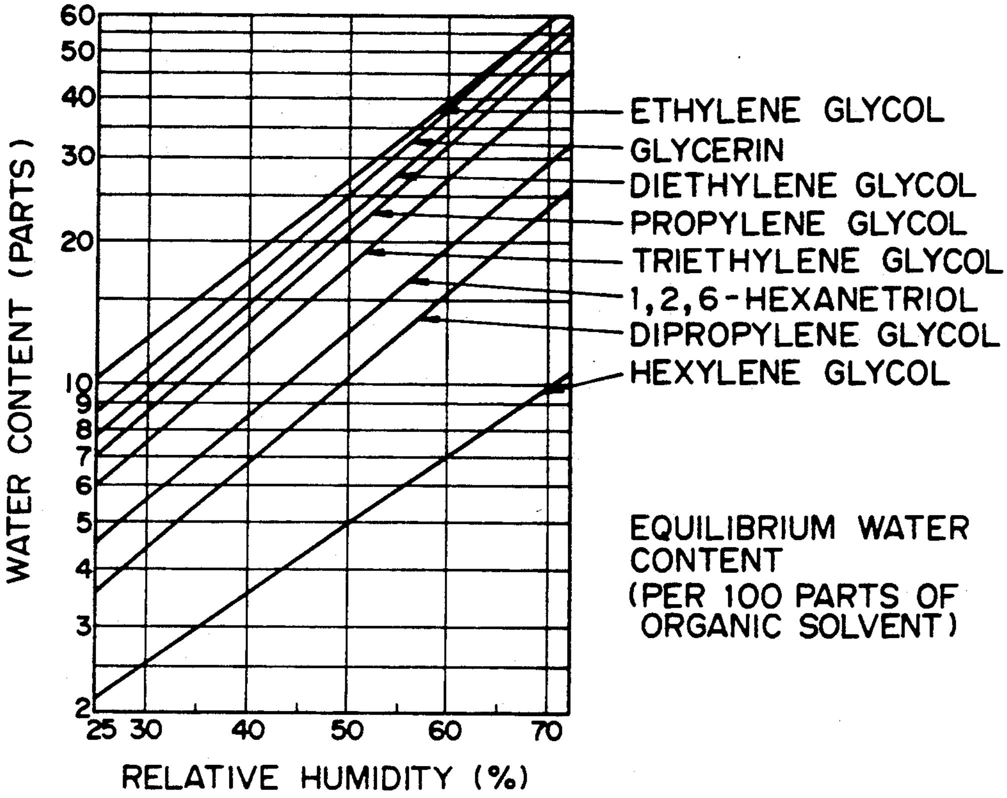
FIG. 6 is a graph showing equilibrium water contents respectively corresponding to various organic solvents.

As an example of the above equilibrium water content, FIG. 6 shows some data which are taken from "Glycols" published by Union Carbide Chemical Corp. Referring to FIG. 6, for example, with respect to 100 parts of ethylene glycol, the amount of absorbed water is about 25 parts and the equilibrium water content is about 20% at 50% RH (21°-27° C.).

As shown in FIG. 6, the equilibrium water content considerably changes depending on humidity. In view of commercial handling, it is preferred that an ink for use in a recording apparatus is usable under a humidity condition of 30–70% RH, more preferably 10–90% RH. Accordingly, it is clearly preferred to preliminarily add a water content to an ink in order to prevent a characteristic change in the ink, as compared with in the case of no preliminary addition of water content to the ink.

For the above reason, it is preferred that a water content is preliminarily added to 100 parts of a dispersion medium comprising an organic solvent in an amount which corresponds to one in the range of from an equilibrium water content at 25° C. and 30% RH, to an equilibrium water content at 25° C. and 70% RH. More specifically, as shown in the following Table 1, it is preferred to preliminarily add a water content to 100 parts of each organic solvent in an amount (parts) as described below.

TABLE 1

| Organic solvent (100 parts) | Water (parts) |
|---|---|
| Ethylene glycol | 12-60 |
| Glycerin | 11-60 |
| Diethylene glycol | 10-55 |
| Propylene glycol | 9-50 |
| Triethylene glycol | 7-40 |
| 1,2,6-Hexanetriol | 5-30 |
| Dipropylene glycol | 4-25 |
| Hexylene glycol | 2.5-10 |

In the case of another organic solvent, or a mixed solvent, it is possible to consider a preferred water content in the same manner as described above.

The above-mentioned equilibrium water content corresponds to a water content (parts) which is to be absorbed into 100 parts of an organic solvent when the organic solvent is left standing with an environment of constant temperature and humidity for a sufficiently long period. This equilibrium water content may be easily measured by means of a measurement system comprising an airtight container, as shown in FIG. 7.

Figure 7:
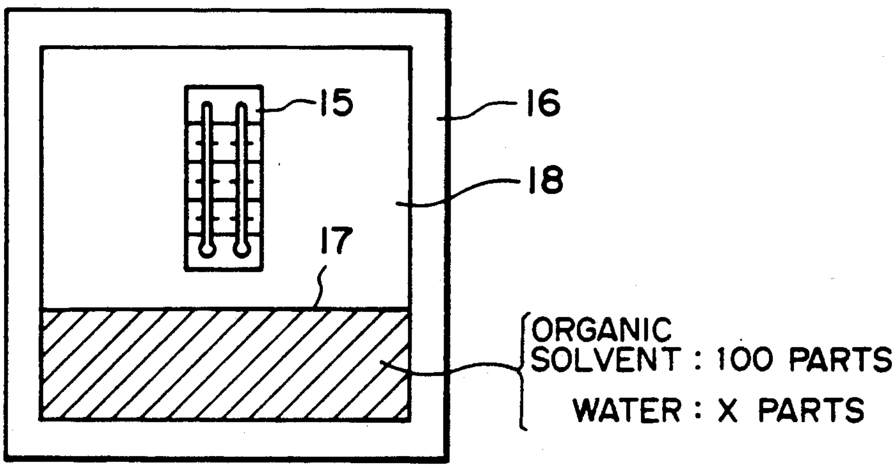
FIG. 7 is a schematic sectional view showing a measurement system for measuring an equilibrium water content.

More specifically, referring to FIG. 7, about 0.1 liter of mixed solvent 17 comprising 100 parts of an organic solvent (sample) and X parts of water is charged in an airtight container 16 (inner volume: about 1 liter) equipped with a hygrometer 15. Then, the remainder portion of the container 16 is filled with dry air 18, and the resultant system is left standing at 25° C. until the indication of the hygrometer 15 reaches an equilibrium. Thus, the humidity (Y %) at this time is measured.

By using several species of the mixed solvents each comprising X parts of water and 100 parts of an organic solvent, the equilibrium water content corresponding to each water content (X) is measured, and the resultant values are interpolated to obtain the value of X ($X_{30}$) corresponding to a humidity of 30% ($Y_{30}$) and the value of X ($X_{70}$) corresponding to a humidity of 70% ($Y_{70}$). The thus obtained $X_{30}$ and $X_{70}$ are used as equilibrium water contents at humidities of 30% and 70% respectively.

In the ink according to the present invention, corresponding to the thus obtained $X_{30}$ and $X_{70}$, it is preferred to use as a liquid dispersion medium a mixture which has been obtained by preliminarily adding water to 100 parts of an organic solvent in an amount of x (parts) satisfying $X_{30}$23 x≦$X_{70}$.

The thus prepared ink is stored and transported ordinarily in a state of being contained in an airtight container, and is commercially handled. In practice, the ink is opened in an environment of 25° C., 50% RH, and the water content thereof (A) is measured by using a Karl Fischer's reagent, etc. Then, the ink is subjected to vacuum drying to measure the solid content (C) thereof, and the amount of a dispersion medium (B) is determined by the equation of B=100 - C.

In this case, an actual ink may preferably satisfy the following formula:

$$X_{30}/(100+X_{30}) \leqq A/B \leqq X_{70}/(100+X_{70})$$

Hereinbelow, the present invention will be explained with reference to Examples which however are not intended to restrict the scope of invention in any way.

EXAMPLES

Example 1

Ethylene glycol: 30 parts
(boiling point (b.p.)=198° C., Relative dielectric constant ($\epsilon_r$)=38.66 at 20° C.)
Polyvinyl alcohol: 3 parts
(Gohsenol GL-03, mfd. by Nihon Gosei Kagaku Kogyo K.K.)
Dye: 1.2 parts
(Kayacion Red P-2B, mfd. by Nihon Kayaku K.K.)
Silica: 4 parts
(Aerosil 200, mfd. by Nihon Aerosil K.K.)

The above components were sufficiently mixed under heating at 60°-70° C., and to the resultant mixture, 20 drops of triethanolamine and 60 drops of a 20 wt. % ethylene glycol solution of sodium borate ($Na_2B_4O_7$) were added. Thereafter, the resultant mixture was cooled to room temperature (25° C.) thereby to obtain a gel ink having a fluidity according to the present invention.

Then, by using the above-mentioned gel ink, image formation was effected by means of a recording apparatus as shown in FIG. 1.

The gel ink was charged in an apparatus as shown in FIG. 1 wherein an ink-carrying roller 1 comprising a cylindrical roller of 40 mm in diameter having a surface of stainless steel with a surface roughness of 100 S and an intermediate transfer roller 4 comprising an iron cylindrical roller of 40 mm in diameter having a surface coated with a hard chromium plating were disposed opposite to each other with a gap of 1 mm at an ink transfer position. The gel ink 2 obtained above was charged in the ink container 3.

The ink-carrying roller 1 was rotated in the arrow A direction at about 15 rpm to form thereon a layer 2*a* of the ink 2, whereby the fluid ink 2 according to the present invention was uniformly applied onto the ink-carrying roller 1 and the surface of the applied ink layer 2*a* was very smooth.

In contact with the thus formed ink layer 2*a*, the intermediate transfer roller 4 was rotated in the arrow B direction at about 15 rpm. In this instance, when electric energy was not supplied from a recording electrode 7 to the ink layer 2*a*, the ink 2 was not substantially transferred to the intermediate transfer roller 4. The recording electrode 7 had a structure as shown in FIG. 4, wherein each electrode element 72 of copper was coated with an insulating film 73 of polyimide except for a tip thereof which was coated with gold plating in an area of 100×100 microns.

On the other hand, when a pulse of 30 V and 2 msec was applied through the ink layer 2*a* between the recording electrode 7 as an anode and the ink-carrying roller 1 as a cathode to pass a current, the ink 2 was selectively transferred to the intermediate transfer roller 4 to form an ink pattern 21 thereon.

At an ink image-transfer position, a platen roller 6 of a 20 mm-dia. iron cylindrical roller surfaces with 10 mm-thick silicone rubber layer was disposed opposite to the intermediate transfer roller 4 with a recording medium 5 of plain paper disposed therebetween moving in the arrow C direction. Further, the platen roller 6 was rotated in the arrow D direction at the same speed as the intermediate transfer roller 4 while exerting a slight pressure onto the recording medium 5. As a result, red-colored dot images (printed letter) 22 corresponding to the above-mentioned ink pattern 21 were formed on the recording medium 5.

The transferred image 22 obtained on the recording medium 5 was a high-quality image having a sufficiently high image density without trailing, fog, or blurring, etc.

Incidentally, the fluid ink 2 of the present invention was charged in a polymer cup (mfd. by Sanko Plastic K.K.) having a volume of 100 ml, and was left open in an atmospheric pressure at room temperature (22°-27° C.) and a humidity of 50% for 180 days to examine the effect of drying on the ink. As a result, there was substantially no change in the viscoelasticity of the ink due to drying, and it was found that the ink of the present invention was excellent in storage stability.

Example 2

An ink was prepared in the same manner as in Example 1 except that dimethylsulfoxide (b.p.=189° C., $\epsilon_r$=48.9) was used as an organic solvent instead of ethylene glycol used in Example 1. The thus prepared ink was subjected to image formation by using the same apparatus and method as in Example 1 to evaluate the resultant image, whereby good results substantially the same as in Example 1 were obtained.

Further, the above-mentioned ink was subjected to a drying test in the same manner as in Example 1. As a result, there was substantially no change in the viscoelasticity of the ink even after it was left for 180 days.

Example 3

An ink was prepared in the same manner as in Example 1 except that a mixture of 15 parts of ethylene glycol and 15 parts of N-methylformamide (b.p.=185° C., $\epsilon_r$=182.4) was used as an organic solvent instead of 30 parts of ethylene glycol used in Example 1. The thus prepared ink was subjected to image formation by using the same apparatus and method as in Example 1 to evaluate the resultant image, whereby good results substantially the same as in Example 1 were obtained.

Further, the above-mentioned ink was subjected to a drying test in the same manner as in Example 1. As a result, similarly as in Example 1, there was substantially no change in the viscoelasticity of the ink even after it was left for 180 days.

Example 4

An ink was prepared in the same manner as in Example 1 except that a mixture of 15 parts of ethylene glycol and 15 parts of formamide (b.p.=210.5° C., $\epsilon_r$=111.0) was used as an organic solvent instead of 30 parts of ethylene glycol used in Example 1. The thus prepared ink was subjected to image formation by using the same apparatus and method as in Example 1 to evaluate the resultant image, whereby good results substantially the same as in Example 1 were obtained.

Further, the above-mentioned ink was subjected to a drying test in the same manner as in Example 1. As a result, there was substantially no change in the viscoelasticity of the ink similarly as in Example 1.

Example 5

An ink was prepared in the same manner as in Example 1 except that a mixture of 20 parts of ethylene glycol and 10 parts of hexamethylphosphoric triamide (b.p.=233° C., $\epsilon_r$=29.6) was used as an organic solvent instead of 30 parts of ethylene glycol used in Example 1. The thus prepared ink was subjected to image formation by using the same apparatus and method as in Example 1 to evaluate the resultant image, whereby good results substantially the same as in Example 1 were obtained.

Further, the above-mentioned ink was subjected to a drying test in the same manner as in Example 1. As a result, there was substantially no change in the viscoelasticity of the ink similarly as in Example 1.

Example 6

An ink was prepared in the same manner as in Example 1 except that a mixture of 20 parts of ethylene glycol and glycerin (b.p.=290° C., $\epsilon_r$=42.5) was used as an organic solvent instead of 30 parts of ethylene glycol used in Example 1. The thus prepared ink was subjected to image formation by using the same apparatus and method as in Example 1 to evaluate the resultant image, whereby good results substantially the same as in Example 1 were obtained.

Further, the above-mentioned ink was subjected to a drying test in the same manner as in Example 1. As a result, there was substantially no change in the viscoelasticity of the ink similarly as in Example 1.

Example 7

An ink was prepared in the same manner as in Example 1 except that a mixture of 20 parts of ethylene glycol and 10 parts of water (b.p.=100° C., $\epsilon_r$=80.1) was used instead of 30 parts of ethylene glycol used in Example 1. The thus prepared ink was subjected to image formation by using the same apparatus and method as in Example 1 to evaluate the resultant image, whereby good results substantially the same as in Example 1 were obtained.

Further, the above-mentioned ink was subjected to a drying test in the same manner as in Example 1. As a result, there was a slight increase in the ink viscosity, but the fluidity thereof was substantially retained so that the ink 2 could sufficiently be applied onto the ink-carrying roller 1 shown in FIG. 1.

Example 8

An ink was prepared in the same manner as in Example 1 except that a mixture of 10 parts of water and 20 parts of N-methylformamide (b.p.=180° C., $\epsilon_r$= 182.4) was used instead of 30 parts of ethylene glycol used in Example 1. The thus prepared ink was subjected to image formation by using the same apparatus and method as in Example 1 to evaluate the resultant image, whereby good results substantially the same as in Example 1 were obtained.

Further, the above-mentioned ink was subjected to a drying test in the same manner as in Example 1. As a result, there was a slight increase in the ink viscosity, but the fluidity thereof was substantially retained so that the ink 2 could sufficiently be applied onto the ink-carrying roller 1 shown in FIG. 1.

Example 9

An ink was prepared in the same manner as in Example 1 except that a mixture of 13 parts of water and 17 parts of N-methylacetamide (b.p.=206° C., $\epsilon_r$=191.3 at 32° C.) was used instead of 30 parts of ethylene glycol used in Example 1. The thus prepared ink was subjected to image formation by using the same apparatus and method as in Example 1 to evaluate the resultant image, whereby good results substantially the same as in Example 1 were obtained.

Further, the above-mentioned ink was subjected to a drying test in the same manner as in Example 1. As a result, there was a slight increase in the ink viscosity, but the fluidity thereof was substantially retained so that the ink 2 could sufficiently be applied onto the ink-carrying roller 1 shown in FIG. 1.

Example 10

An ink was prepared in the same manner as in Example 1 except that formamide (b.p.=210.5° C., $\epsilon_r$=111.0 at 20° C.) was used instead of ethylene glycol used in Example 1. The thus prepared ink was subjected to image formation by using the same apparatus and method as in Example 1 to evaluate the resultant image, whereby good results substantially the same as in Example 1 were obtained.

Further, the above-mentioned ink was subjected to a drying test in the same manner as in Example 1. As a result, there was substantially no change in the viscoelasticity of the ink, similarly as in Example 1.

Comparative Example 1

An ink was prepared in the same manner as in Example 1 except that 30 parts of water was used instead of 30 parts of ethylene glycol used in Example 1. The thus prepared ink was subjected to image formation by using the same apparatus and method as in Example 1 to evaluate the resultant image, whereby good results substantially the same as in Example 1 were obtained.

Further, the above-mentioned ink was subjected to a drying test in the same manner as in Example 1, whereby the solvent was dried up and the ink was hardened. The resultant ink, as such, could not be used for image formation.

Comparative Example 2

Xylene: 30 parts
($\epsilon_r$=2.266 at 20° C., vapor pressure<100 mmHg)
Ethylene-vinyl acetate copolymer resin: 10 parts
(Evaflex 45X, mfd. by Mitsui-Du Pont Polychemical K.K.)
Pigment: 2 parts
(Cromophtal Blue 4GNP, mfd. by Nihon Ciba-Geigy K.K.)

The above components were sufficiently mixed under heating to obtain a gel ink having a fluidity.

Image formation was attempted by applying the thus prepared ink to the image recording apparatus as shown in FIG. 1 in the same manner as in Example 1. However, the transferred image had much fog and soiling and was not suitable at all.

Comparative Example 3

An ink was prepared in the same manner as in Comparative Example 2 except that tetrahydrofuran (vapor pressure=176 mmHg at 25° C., $\epsilon_r$=7.58) was used instead of xylene.

Image formation was attempted by applying the thus prepared ink to the image recording apparatus as shown in FIG. 1 in the same manner as in Comparative Example 1. However, the transferred image had much fog and soiling and was not suitable at all. Further, the ink was poor in storage stability because it was dried up in a short time.

Example 11

Ethylene glycol: 80 parts
Water: 20 parts
Polyvinyl alcohol 11 parts
(Gohsenol GL-03, mfd. by Nihon Gosei Kagaku Kogyo K.K., average polymerization degree: 300, saponification degree: 88 mol %)
Carbon black: 11 parts
Silica: 11 parts
(Aerosil 200, mfd. by Nihon Aerosil K.K.)
NaCl: 6.6 parts The above components were sufficiently mixed at a high temperature (80° C.) and then cooled. Then, 1.5 parts of borax ($Na_2B_4O_7 \cdot 5H_2O$) and 4.3 parts of 1N-NaOH were added to the resultant mixture, thereby to prepare a gel ink having a fluidity.

Figure 5:
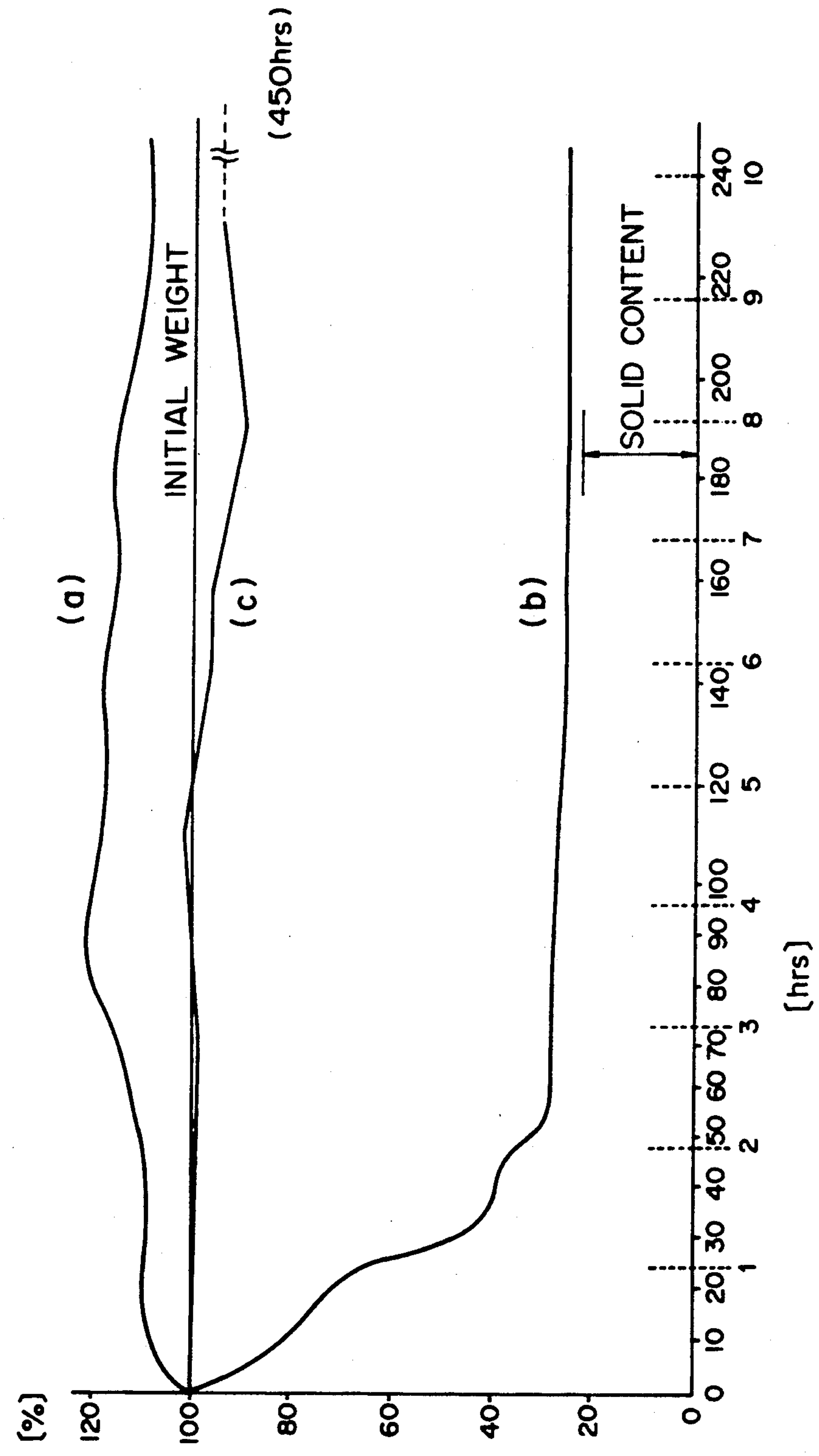
FIG. 5 is a graph showing weight changes in the inks of Example 11, Example 12 and Comparative Example 4 when they are left open under conditions of 25° C. and 50% RH.

When the thus prepared ink was left open in a room at 25° C. and 50% RH, it should substantially no weight change as shown by a curve (C) in FIG. 5. Further, even after the ink was left standing for 450 hours, it showed substantially no change in apparent physical property thereof such as viscoelasticity as compared with the initial state.

Separately, the same gel ink was stored in an airtight polyethylene bottle in the same room as described above.

The thus obtained two species of inks, i.e., Ink (A) which had been left opening the room and Ink (B) which had been stored in the airtight bottle, were respectively subjected to image formation by means of an image recording apparatus as shown in FIG. 2.

In FIG. 2, an ink-application roller 11 comprising a cylindrical roller of 40 mm in diameter having a surface of stainless steel 304 of which surface had been ground with a grinder, and an ink-carrying roller 1 comprising a stainless steel 304 roller of 40 mm in diameter of which surface had been subjected to blasting treatment so as to provide a roughness of $R_Z$=100 microns were disposed opposite to each other with a gap of $d_1$=2 mm at an ink supply position. Further, an intermediate transfer roller 4 comprising a stainless steel 304 roller of 40 mm in diameter, of which surface had been ground with a grinder, and the above-mentioned ink-carrying roller 1 were disposed opposite to each other with a gap of $d_2$=2 mm at an ink transfer position. Each of the two species of gel inks of (Ink (A) and Ink (B)) of the present invention obtained above was charged in an ink-holding member 3a.

The ink-carrying roller 1 was rotated in the arrow A direction at about 20 rpm, and the ink-application roller 11 was rotated in the arrow F direction at about 10 rpm to form a layer 2a of the ink 2 on the ink-carrying roller 1. As a result, the fluid ink 2 of the present invention could be uniformly applied onto the ink-carrying roller 1 and the surface of the ink layer applied onto the ink-carrying roller 1 was extremely smooth.

Then, in contact with the layer 2a of the ink 2, the intermediate transfer roller 4 was rotated in the arrow B direction at about 20 rpm. In this instance, when electric energy was not supplied from a recording electrode 7 to the ink layer 2a, the ink 2 was not substantially transferred to the intermediate transfer roller 4. The recording electrode 7 was disposed with a gap of $d_3$=1.7 mm from the surface of the ink-carrying roller 1, at an energy application position.

The recording electrode 7 had a structure wherein each electrode element of copper was coated with an insulating film except for a tip thereof which was coated with rhodium plating in an area of 100×100 microns.

On the other hand, when a pulse of 25 V and 2 msec was applied through the ink layer 2a between the recording electrode 7 as an anode and the ink-carrying roller 1 as a cathode to pass a current, the ink 2 was selectively transferred to the intermediate transfer roller 4 to form an ink pattern 21 thereon.

At an ink image-transfer position, a platen roller 6 of a 16 mm-dia. iron cylindrical roller surfaced with 2 mm-thick silicone rubber layer was disposed opposite to the intermediate transfer roller 4 with a recording medium 5 of plain paper disposed therebetween moving in the arrow C direction. Further, the platen roller 6 was rotated in the arrow D direction at the same speed as the intermediate transfer roller 4 while exerting a slight pressure onto the recording medium 5. As a result, black colored dot images (printed letter) 22 corresponding to the above-mentioned ink pattern 21 were formed on the recording medium 5.

When any of the Ink (A) and the Ink (B) was used, the transferred image 22 obtained on the recording medium 5 was a high-quality image having a sufficiently high image density without trailing, fog, or blurring, etc.

Incidentally, with respect to the image forming apparatus as shown in FIG. 2 used in this instance, it is possible to refer to a preceding patent application filed by our research group (Japanese Patent Application No. 125970/1987).

Comparative Example 4

Water: 30 parts
Polyvinyl alcohol: 3 parts
(Gohsenol GL-03, mfd. by Nihon Gosei Kagaku Kogyo K.K.)
Dye: 1.2 parts
(Kayacion Red P-2B, mfd. by Nihon Kayaku K.K.)

Silica: 4 parts (Aerosil 200, mfd. by Nihon Aerosil K.K.)

The above components were sufficiently mixed under heating, and to the resultant mixture, 20 drops of 1N-NaOH and 60 drops of a 20 wt. % ethylene glycol solution of sodium borate ($Na_2B_4O_7$) were added. Thereafter, the resultant mixture was cooled to room temperature (25° C.) thereby to obtain a gel ink having a fluidity.

Then, by using the above-mentioned gel ink, image formation was effected by means of a recording apparatus as shown in FIG. 2. As a result, a good transferred image 22 was obtained when a pulse of 10 V and 2 msec was used.

On the other hand, when this ink was left open at 25° C. and 50% RH, it showed a weight decrease as shown by a curve (b) in FIG. 5. Further, after being left standing for 20 hours, the ink could not be applied onto the ink-carrying roller 1, and could not be used. On the contrary, when the ink was stored in an airtight polymer bottle, the performance thereof was stable so as not to be changed from its original state, even after the ink was left standing for 450 hours.

Example 12

An ink containing substantially no water was prepared in the same manner as in Example 11 except that the mixture comprising 80 parts of ethylene glycol and 20 parts of water was replaced by 100 parts of ethylene glycol from which water content had been sufficiently removed, the borax (pentahydrate) was replaced by anhydrous borax, and the aqueous NaOH solution was replaced by 2.6 parts of triethanolamine.

When the thus prepared ink was subjected to image formation, it provided an image substantially the same as in Example 11. Incidentally, in this instance, the recording voltage was required to be about 30 V.

When the ink was left open in the air at 25° C., 50% RH, it showed a weight change as shown by a curve (a) in FIG. 5. After being left standing for 100 hours, the ink showed a certain increase in adhesiveness, and it was liable to provide slight image fog. However, when 0.5 part of borax was added to such ink, the ink substantially recovered its initial state.

On the other hand, when the ink was stored in an airtight polymer bottle, it provided a good image without problem even after being left standing for 450 hours.

Comparative Example 5

An ink was prepared in the same manner as in Example 11 except that 100 parts of water was used alone and ethylene glycol was not used.

The thus prepared ink provided a good image in the initial stage. However, when this ink was left open in the air at 25° C. and 50% RH, after being left standing for 20 hours, the ink could not be applied onto the ink-carrying roller 1, and could not be used. On the contrary, when the ink was stored in an airtight polymer bottle, such phenomenon did not occur.

Examples 13-15

Inks were prepared in the same manner as in Example 11 except that the components shown in the following Table 2 were respectively used.

TABLE 2

| Components | Ex. 13 | Ex. 14 | Ex. 15 |
|---|---|---|---|
| Ethylene glycol | 80 | 90 | 62 |

TABLE 2-continued

| Components | Ex. 13 | Ex. 14 | Ex. 15 |
|---|---|---|---|
| | (parts) | | |
| Water | 16 | 6 | 34 |
| Polyvinyl alcohol (Gohsenol GL-03, average polymerization degree: 300, saponification degree: 88 mol %) | 20 | 20 | 20 |
| KCl | 2 | 2 | 2 |
| Carbon black | 3 | 3 | 3 |
| 20 wt. % ethylene glycol solution of borax | 4 | 4 | 4 |
| 1N-NaOH aqueous solution | 4 | about 4 | about 4 |

In the ink obtained in the above Examples 13-15, water was contained in amounts of 25, 12 and 60 parts, respectively, per 100 parts of ethylene glycol.

When the thus obtained inks of Examples 13-15 were respectively subjected to image formation in the same manner as in Example 11, they provided good images. Further, the voltage required for such image formation was as low as about 10 V, while the reason therefor was not necessarily clear.

Even after these inks of Examples 13-15 were left open in a room (25° C., 50% RH) for one week, they respectively provided good images in the image formation as described above, while the ink of Example 14 was somewhat softened and that of Example 15 was somewhat hardened.

Example 16

An ink was prepared in the same manner as in Comparative Example 4 except that 30 parts of water was replaced by a mixture comprising 23 parts of ethylene glycol and 7 parts of water. The thus obtained ink was excellent in storage stability and image formation stability, even after being left open in the air.

Examples 17-22

Inks were prepared in the same manner as in Example 13 except that dispersion compositions shown in the following Table 3 were respectively used, instead of the mixture of 80 parts of ethylene glycol and 16 parts of water used in Example 13.

TABLE 3

| | Example | | | | | |
|---|---|---|---|---|---|---|
| Component | 17 | 18 | 19 | 20 | 21 | 22 |
| Propylene glycol | 89 | 80 | 66 | — | — | — |
| Diethylene glycol | — | — | — | 91 | 80 | 65 |
| Water | 11 | 20 | 34 | 9 | 20 | 35 |

Incidentally, the amount of the 1N-NaOH aqueous solution was appropriately adjusted so that each ink showed a hardness (or fluidity) the same as that of the ink of Example 13, immediately after the production thereof.

When the thus prepared inks were subjected to an image formation test and a storage stability test in the same manner as in Example 11, they respectively provided good results substantially the same as in Example 11.

Example 23

Composition A

Propylene glycol: 15 parts

Water: 5 parts

N-methylformamide: 6 parts
($\epsilon_r$=182.4 at 25° C.)
Polyvinyl alcohol: 6 parts
(Gohsenol GL-03, mfd. by Nihon Gosei Kagaku K.K.)
Potassium iodide: 3.5 parts
Carbon black: 2.5 parts
(Stering SR, mfd. by Cabot Co., U.S.A.)

Composition B

Silica: 3 parts
(Aerosil 200, mfd. by Nihon Aerosil K.K.)
20 wt. % Propylene glycol solution of sodium tetraborade: 2.5 parts
1N-NaOH aqueous solution: 0.5 part The above components in Composition A were uniformly mixed under heating at 80°-90° C., and to the resultant mixture, the above components in Composition B were added and stirred thereby to prepare a gel ink having a volume resistivity of 230 Ω·cm.

The thus obtained ink was subjected to image formation by using a recording apparatus as shown in FIG. 2. Referring to FIG. 2, an ink-carrying roller 1 of a stainless steel cylinder having an outside diameter of 40 mm was rotated in the arrow A direction, and the ink 2 was carried thereon. The ink 2 was formed into an ink layer *2a* having a constant thickness by an ink application means 11 rotating in the arrow F direction.

In this instance, the peripheral speed of the ink-carrying roller 1 was set to 20 mm/sec, that of the ink application roller 1 was set to 24 mm/sec, and the gap therebetween was set to 1.0 mm, so that the ink layer formed on the surface of the ink-carrying roller 1 had a thickness of about 1.2 mm.

An intermediate transfer roller 4 of a stainless steel cylinder having an outside diameter of 30 mm was disposed above the ink-carrying roller 1 with a gap of about 1.0–1.2 mm from the surface of the ink-carrying roller 1. The intermediate transfer roller was rotatable by a driving means (not shown) in the arrow B direction while being in contact with the ink layer *2a* formed on the ink-carrying roller 1. Further, a platinum electrode was used as a recording electrode 7 and a recording voltage of +25 V was used.

Thus, the ink was evaluated in terms of an image density at the time at which the total weight of the ink remaining in the apparatus was decreased by 3.5 g from the initial ink weight (30 g). As a result, when the ink weight was decreased by 3.5 g, the image density was slightly decreased from the initial value thereof but the decrease was such that it substantially caused no problem in practice.

Further, when 3.5 g of water was added to the ink which had shown the weight decrease of 3.5 g, the physical properties of the ink such as sensitivity were recovered to the initial state. Accordingly, it was considered that the most of the decrease of 3.5 g was based on the vaporization of water.

Example 24

Composition A

Propylene glycol: 15 parts
Water: 6 parts
N-methylpropionamide: 5 parts
($\epsilon_r$=172,2 at 25° C.)
Polyvinyl alcohol: 6 parts
(Gohsenol GL-03, mfd. by Nihon Gosei Kagaku K.K.)
Potassium iodide: 3.5 parts
Carbon black: 2.5 parts
(Stering SR, mfd. by Cabot Co., U.S.A.)

Composition B

Silica: 3 parts
(Aerosil 200, mfd. by Nihon Aerosil K.K.)
20 wt. %-Propylene glycol solution of sodium tetraborate: 2 parts
1N-NaOH aqueous solution: 0.3 part An ink according to the present invention was prepared in the same manner as in Example 23 by using the above Compositions A and B. The thus prepared ink had a volume resistivity of 200 Ω·cm.

The above ink was evaluated in the same manner as in Example 23. As a result, when the ink weight was decreased by 3.5 g, the image density was slightly decreased from the initial value thereof but the decrease was such that it substantially caused no problem in practice.

Example 25

Composition A

Propylene glycol: 13 parts
Water: 6 parts
N-methylacetamide: 7 parts
($\epsilon_r$=191.3 at 25° C.)
Polyvinyl alcohol: 3 parts
(Gohsenol GL-05, mfd. by Nihon Gosei Kagaku K.K.)
Potassium iodide: 3.5 parts
Carbon black: 2.5 parts
(Stering SR, mfd. by Cabot Co., U.S.A.)

Composition B

Silica: 3 parts
(Aerosil 200, mfd. by Nihon Aerosil K.K.)
20 wt. %-Propylene glycol solution of sodium tetraborate: 2.3 parts
1N-NaOH aqueous solution: 0.2 part An ink according to the present invention was prepared in the same manner as in Example 23 by using the above Compositions A and B. The thus prepared ink had a volume resistivity of 195 Ω·cm.

The above ink was evaluated in the same manner as in Example 23. As a result, when the ink weight was decreased by 3.5 g, the image density was slightly decreased from the initial value thereof but the decrease was such that it substantially caused no problem in practice.

Example 26

Composition A

Ethylene glycol: 20 parts
Water: 6 parts
N-methylformamide: 6 parts
($\epsilon_r$=182.4 at 25° C.)
Polyvinyl alcohol: 3 parts
(Gohsenol GL-03, mfd. by Nihon Gosei Kagaku K.K.)
Sodium chloride: 2 parts
Carbon black: 3 parts
(Stering SR, mfd. by Cabot Co., U.S.A.)

Composition B

Silica: 3 parts
(Aerosil 200, mfd. by Nihon Aerosil K.K.)
Sodium tetraborate: 0.4 part
1N-NaOH aqueous solution: 2 parts An ink according to the present invention was prepared in the same manner as in Example 23 by using the above Compositions A and B. The thus prepared ink had a volume resistivity of 200 Ω·cm.

The above ink was evaluated in the same manner as in Example 23. As a result, when the ink weight was decreased by 3.5 g, the image density was slightly decreased from the initial value thereof but the decrease was such that it substantially caused no problem in practice.

Example 27

Composition A

Propylene glycol: 15 parts
Water: 6 parts
Ethylene carbonate: 6 parts
($\epsilon_r$=89.6 at 25° C.)
Polyvinyl alcohol: 6 parts
(Gohsenol GL-03, mfd. by Nihon Gosei Kagaku K.K.)
Potassium iodide: 3.5 parts
Carbon black: 2.5 parts
(Stering SR, mfd. by Cabot Co., U.S.A.)

Composition B

Silica: 3 parts
(Aerosil 200, mfd. by Nihon Aerosil K.K.)
20 wt. %-Propylene glycol solution of sodium tetraborate: 2 parts
1N-NaOH aqueous solution: 0.3 part An ink according to the present invention was prepared in the same manner as in Example 23 by using the above Compositions A and B. The thus prepared ink had a volume resistivity of 220 Ω·cm.

The above ink was evaluated in the same manner as in Example 23. As a result, when the ink weight was decreased by 3.5 g, the image density was slightly decreased from the initial value thereof but the decrease was such that it substantially caused no problem in practice.

As described hereinabove, the present invention provides many advantages as described below.

(1) There is provided an ink which provides an image recording method capable of being easily effected at an extremely low recording cost than the thermal transfer recording method and free from plugging of a nozzle or blurring of recorded images as encountered in the ink-jet recording method.

(2) There is provided an ink which is suitably used in a novel image recording method utilizing the control of ink adhesiveness, and has excellent storage stability such that it shows little characteristic change due to drying, etc., and suitably retains its fluidity when left standing in the air for a long period.

(3) There is provided an ink which provides good sensitivity and a sharp change in its crosslinked structure due to energy application, and provides good selective transferability so that it can stably control its adhesiveness.

(4) There is provided an ink excellent in energy efficiency, which is capable of providing a good recorded image under the application of small quantity of energy.

What is claimed is:

1. An image recording ink, comprising:

a liquid dispersion medium, a colorant and a crosslinked substance impregnated with the liquid dispersion medium, said crosslinked substance being present in a proportion of 0.2 to 50 parts per 100 parts of said liquid dispersion medium, the ink being capable of causing a change in adhesiveness thereof by an electrochemical reaction, wherein said liquid dispersion medium (i) is present in amounts from 30 to 95% by weight based on the total weight of the ink and (ii) comprises water, a glycol-type solvent, and an organic solvent having a relative dielectric constant of 80 or larger at 25° C.

2. An ink according to claim 1, wherein said liquid dispersion medium comprises 10–35 parts of water, 40–70 parts of said glycol-type solvent, and 5–40 parts of said organic solvent.

3. An ink according to claim 1, wherein said glycol-type solvent is selected from the group consisting of propylene glycol, ethylene glycol, diethylene glycol, trimethylene glycol, dipropylene glycol, hexylene glycol, 1,2,6-hexanetriol, tetraethylene glycol, polypropylene glycol, and glycerin.

4. An ink according to claim 1, wherein said organic solvent is selected from the group consisting of N-methylacetamide, N-methylformamide, N-methylpropionamide, and ethylene carbonate.

* * * * *

UNITED STATES PATENT AND TRADEMARK OFFICE

CERTIFICATE OF CORRECTION

PATENT NO. : 5,100,468 Page 1 of 2

DATED : March 31, 1992

INVENTOR(S) : Yuasa et al.

It is certified that error appears in the above-identified patent and that said Letters Patent is hereby corrected as shown below:

COLUMN 7:

Line 18, "carrageenah," should read --carrageenan,--.

COLUMN 8:

Line 15, "crosslinked, structure" should read --cross-linked structure,--.

COLUMN 14:

Line 4, "transfer medium 4" should read --transfer roller 4--.

COLUMN 15:

Line 19, "an" should read --a--.

Line 55, "however," should read --However,--.

COLUMN 17:

Line 16, "$X_{30}23\ x \leq X_{70}$." should read --$X_{30} \leq x \leq X_{70}$.--.

UNITED STATES PATENT AND TRADEMARK OFFICE

CERTIFICATE OF CORRECTION

PATENT NO. : 5,100,468 Page 2 of 2

DATED : March 31, 1992

INVENTOR(S) : Yuasa et al.

It is certified that error appears in the above-identified patent and that said Letters Patent is hereby corrected as shown below:

COLUMN 21:

Line 49, "should" should read --showed--.

Line 59, "opening" should read --open in--.

COLUMN 25:

Line 14, "raborade:" should read --raborate:--.

Line 32, "roller 1" should read --roller 11--.

Signed and Sealed this

Third Day of August, 1993

Attest:

MICHAEL K. KIRK

*Attesting Officer*

*Acting Commissioner of Patents and Trademarks*